March 5, 1963 R. P. MOLITOR ETAL 3,079,644
METHOD OF MAKING DECORATED PLASTIC ARTICLES
Filed Jan. 3, 1955 4 Sheets-Sheet 1
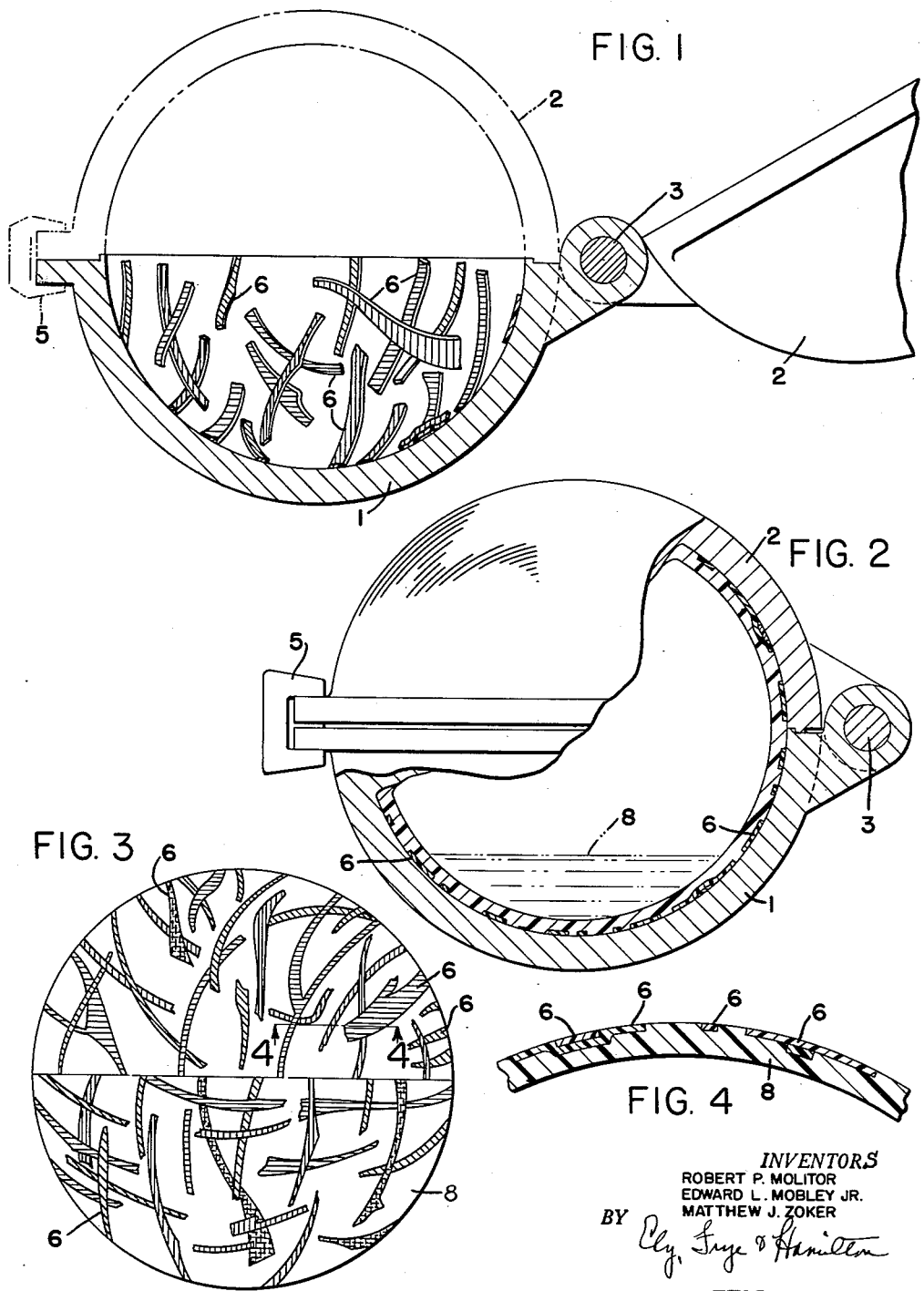
INVENTORS
ROBERT P. MOLITOR
EDWARD L. MOBLEY JR.
MATTHEW J. ZOKER
BY
ATTORNEYS

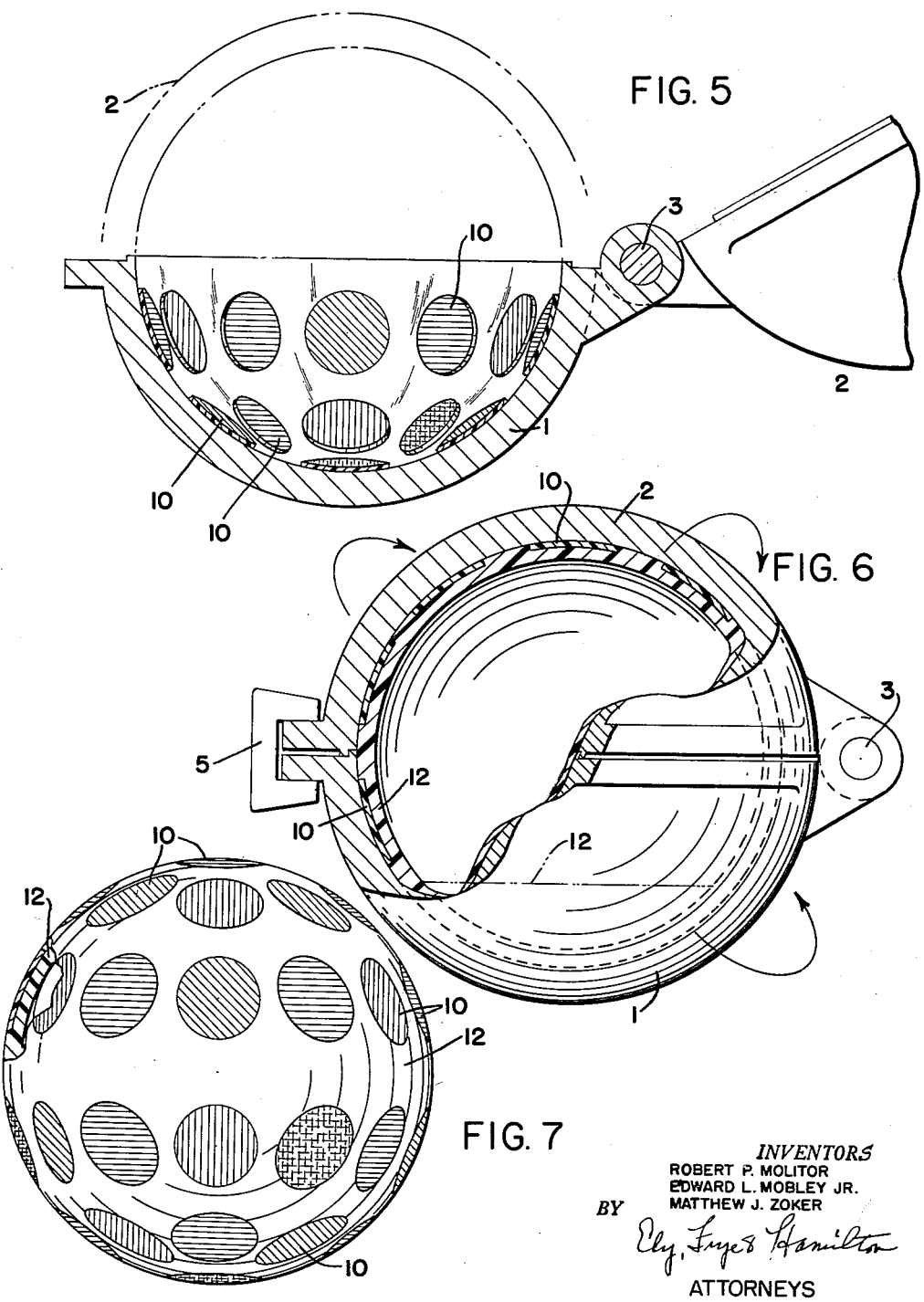

March 5, 1963    R. P. MOLITOR ETAL    3,079,644
METHOD OF MAKING DECORATED PLASTIC ARTICLES
Filed Jan. 3, 1955    4 Sheets-Sheet 3
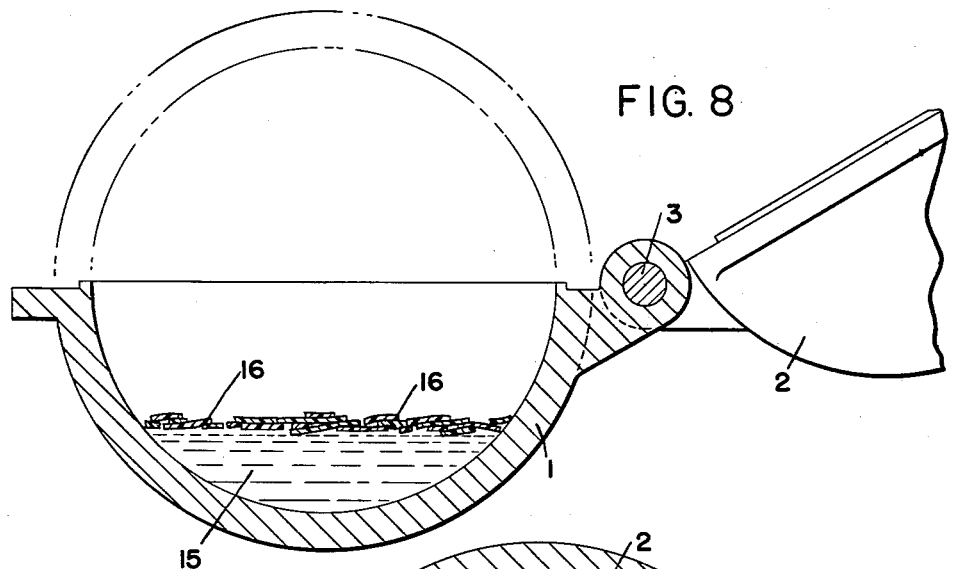
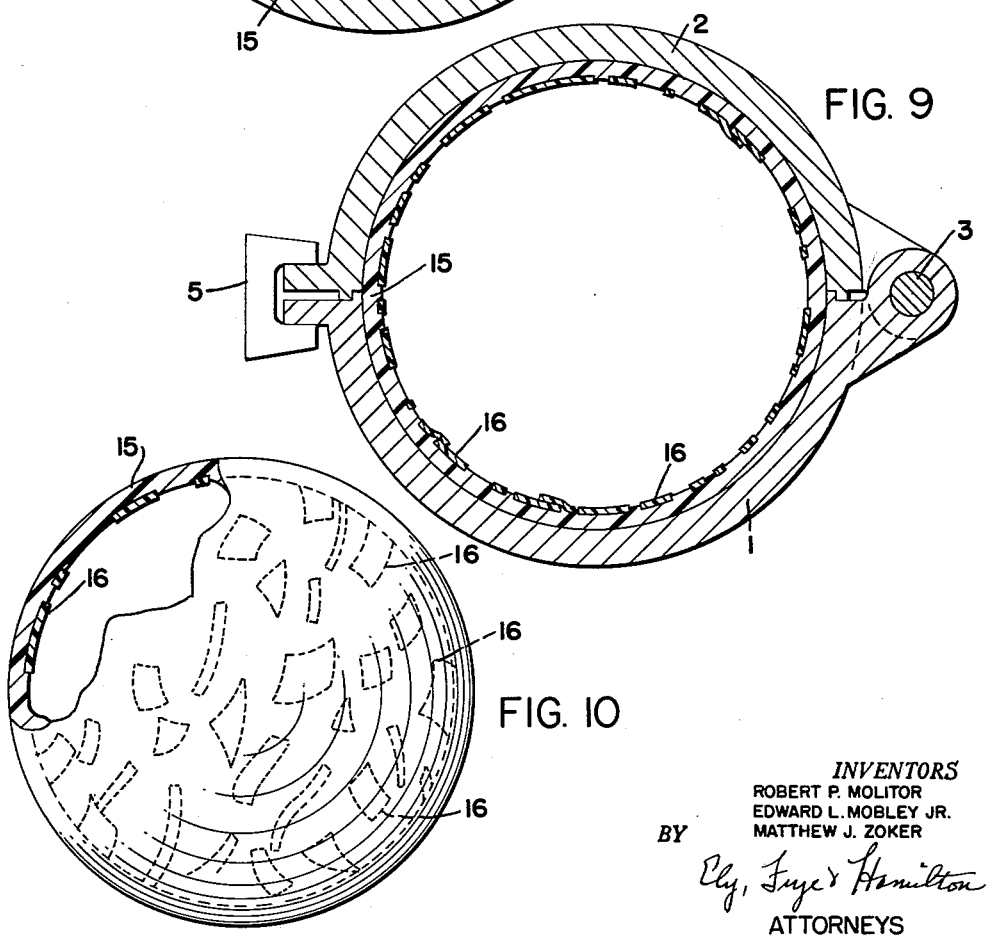
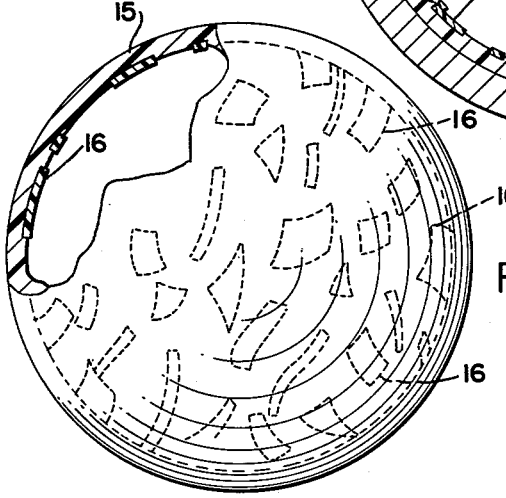
INVENTORS
ROBERT P. MOLITOR
EDWARD L. MOBLEY JR.
BY   MATTHEW J. ZOKER
ATTORNEYS March 5, 1963 R. P. MOLITOR ETAL 3,079,644
METHOD OF MAKING DECORATED PLASTIC ARTICLES
Filed Jan. 3, 1955 4 Sheets-Sheet 4

INVENTORS
ROBERT P. MOLITOR
EDWARD L. MOBLEY JR.
MATTHEW J. ZOKER
BY
ATTORNEYS

United States Patent Office 3,079,644
Patented Mar. 5, 1963

3,079,644
METHOD OF MAKING DECORATED PLASTIC ARTICLES
Robert P. Molitor and Edward L. Mobley, Jr., Akron, and Matthew J. Zoker, Barberton, Ohio, assignors to The Sun Rubber Company, Barberton, Ohio, a corporation of Ohio
Filed Jan. 3, 1955, Ser. No. 479,538
2 Claims. (Cl. 18—59)

The present invention relates to a process of making decorative articles from thermo-plastic plastisols. Polyvinyl chloride resins are the most commonly employed, but vinyl acetates, copolymers of vinyl acetate and vinyl chloride, or copolymers of vinyl chloride and vinylidene chloride, polyethylene and other materials which react in like fashion may be substituted therefor. With these resins are used a variety of plasticizers which are well known in the art.

The invention was primarily designed for the manufacture of decorative play balls made by rotational casting, but the principles thereof may be applied to the manufacture of many other products made from these and similar resins. Heretofore, one method of decorating balls or articles of this type has been by painting the surface of the finished article, but this method is not satisfactory as the colors are likely to flake off or rub off in use. Another method has been to insert liquid plastisols of differing colors in the mold and by rotating or agitating the mold, distributing the colors so as to obtain a mottled or marbled effect, and then fusing the object. This process will result in the formation of a variegated object but, due to the fact that both plastisols are liquid, there is no way of controlling the pattern, and during the fusing of the plastisols the colors will run together.

The inability to obtain permanent designs by painting and to obtain sharply defined designs by the marbling process above described has led to the development of the present process. In the description which is to follow, representative examples only are given, but it will be understood that once having explained the procedure it is possible to vary details thereof without losing the benefits of the invention or departing from the principles thereof.

Basically, the invention consists in preforming plastisols of one or more colors in the pattern desired and then flowing a charge of plastisol of a contrasting color in and around the preformed plastisols and gelling and fusing the second plastisol without breaking down or destroying the pattern formed by the first plastisol or plastisols. For this basic procedure there are a number of specific variations by which a variety of results can be obtained.

By one method a plastisol or plastisols of one or more colors are applied to a molding surface which is heated to a temperature which will fix the plastisol in definite patterns. As soon as the first application of plastisol has solidified, the charge of the second plastisol is flowed over the mold surface and over the previously set plastisol or plastisols. The second plastisol, which will form the background, may be distributed by spreading it over the mold surface or by rotating the mold in accordance with the general process described in a prior patent of Robert P. Molitor, No. 2,629,134, dated February 24, 1953, or by what is known in the trade as slush-molding in which an excess charge of the second plastisol is admitted to the mold and when a layer of sufficient depth has formed in the mold, any ungelled plastisol is poured out. By solidification of the first charge before the second charge is admitted to the mold, the permanence of the pattern of contrasting color or colors is preserved and sharp patterns are obtained.

In the above described procedure, the mold or molding surface should be preheated to the temperature at which the first applied plastisol forming the design will gel and fix in a matter of a few seconds. When the base or background plastisol is applied, it too will fix but in so doing it will not cause the first plastisols to soften appreciably or blend with the background. In this procedure the plastisols of the design and the background will gel and fuse at substantially the same temperatures. The plasticizers which are used with the basic resins in both operations may be substantially the same.

In the Molitor prior patent referred to above, a typical composition of resin and plasticizers and other compounding ingredients is given and the formula outlined therein may be followed.

Instead of preheating the mold to gelling temperature before applying the plastisol or plastisols which are to form the designs, the molding surface may be first heated to a temperature below that at which the body or background plastisol will gel and then, on this low-heated surface, the plastisol or plastisols which are to form the design, but which are compounded to fix at the lower temperature, are placed or spread. After the design is made on the molding surface, the body or background plastisol which is compounded to fix at a higher temperature is spread or flowed over the molding surface and the molding surface is raised to the temperature at which the background plastisol will fix. As the first applied plastisol or plastisols have already solidified, the outlines thereof will not change when the background plastisol is admitted or when the molding surface is subjected to the temperature required to gel and fuse the second charge.

A further variation by which excellent results are obtainable is to compound the design plastisol so that it has a relatively high resistance to flow, distributing the compound which has the high resistance to flow in the desired pattern over a cold mold surface, then raising the temperature of the mold to the fusing temperature of the design plastisol, and then flowing the background plastisol over the design and raising the temperature of the mold to the fusing temperature of the background plastisol.

Obtaining plastisols which will set at sufficiently widely separated temperatures is well within the skill of one familiar with the general art of plastics and the literature on the subject gives all that is required by one skilled in this art to practice the invention after the basic steps have been pointed out as in this specification.

In the practice of the invention, the following is a typical formula which may be used for the process. In giving the formula, the plastisol used for the design is compounded in accordance with the following formula so as to increase its heat sensitivity and cause it to solidify at approximately 160° F.

| | Parts |
|---|---|
| Geon 121 | 70 |
| Geon 126 | 30 |
| TCP | 80 |
| Stabilizer | 2 |
| Color to suit. | |

"Geons" are given as they are well known commercial forms of polyvinyl chloride or copolymers of vinyl chloride and vinylidene chloride which are made and sold by B. F. Goodrich Chemical Company of Cleveland, Ohio. The distinctions between the various types of "Geons" reside in their molecular weight, those of lighter weight having lower critical temperatures at which they will gel and fuse. As an added factor to impart low heat sensitivity to the first or design resin, it is well known that the type of plasticizer affects the gelling temperature, a plasticizer with high solvating properties imparting greater heat sensitivity to the compound. Thus while TCP (tricresyl phosphate) is given as a typical plasticizer, tributoxyethyl phosphate is also a strong solvent and may be used together with other standard plasticizers such as dioctyl phthalate or dioctyl adipate. Indeed, the range of plasticizers is well known and references to catalogs of various chemical manufacturers will supply adequate information so that one familiar with the art will be able to supply formulae to obtain the desired results.

The stabilizer which is used is one which should have an affinity for hydrochloric acid. Many of these are well known, one of the more common ones being what is known as S–52, which is a tin dilaurate, the product of Advanced Solvents of New York, N.Y. Other widely used types of stabilizers are barium-cadmium laurate, lead salts and the like. One familiar with the art would be able to supply other available stabilizers.

Any number of batches of the design of different colors may be employed and these will be sprinkled, sprayed or spread on the molding surface. After the design plastisols have formed, either by the preheating of the mold to the proper temperature for both the design and the background plastisols, or by reason of the greater heat sensitivity of the design plastisol, the plastisol which is to become the background is poured or spread over the design plastisols and is then solidified.

As examples of the compositions for the background or for both the design and background plastisols if the same temperatures are used for both operations, the following may be employed:

*Example No. 1*

| | Lbs. |
|---|---|
| Polyvinyl chloride | 70 |
| Dioctyl phthalate (DOP) | 25 |
| Dioctyl adipate | 15 |
| HB–40* | 10 |
| Stabilizer | 2 |

Fillers and color to suit.

*Described by the makers thereof as a partially hydrogenated mixture of isomeric terphenyl.

The above composition of polyvinyl chloride and plasticizers will fuse at between 300° and 335° F.

*Example No. 2*

| | Lbs. |
|---|---|
| Geon 121 | 50 |
| Geon 202 | 30 |
| AO* | 20 |
| DOP | 80 |
| Stabilizer | 3 |

Filler and color to suit.

*Said by the makers to be a vinyl chloride-maleic ester copolymer.

The above composition will fuse at slightly higher temperatures than the composition of Example No. 1, i.e., in excess of 335° F.

The above compositions and those similar to them may be used as the plastisols for the design by employing plasticizers with greater solvating properties or by modifying the molecular weight of the selected resin, as has been set forth.

Having given adequate information with respect to compositions to be used for the design plastisols and for the background plastisols, the following are the procedural steps employed, having reference to the various figures of the accompanying drawings in which certain steps are shown, it being understood that strict adherence to any one of the procedures is not necessary and that, within the scope of the claims, variations and modifications may be made in embodiments of the invention. For convenience, the plastisol used for the design will be termed the "design plastisol" and the plastisol used for the background as the "background plastisol."

In the drawings:

FIG. 1 is a cross-sectional view of a typical ball mold showing an example of decorative design therein, with the design plastisol in place.

FIG. 2 is a view partially in section showing the background plastisol in the closed mold and partially solidified.

FIG. 3 is a view of a decorated ball made by the new process.

FIG. 4 is an enlarged cross section on the line 4—4 of FIG. 3.

FIGS. 5 and 6 are views similar to FIGS. 1 and 2 but showing a modification of the basic method.

FIG. 7 is a view of a decorated ball made by the process of FIGS. 5 and 6.

FIGS. 8 and 9 are views similar to FIGS. 1 and 2 but showing a further modification of the basic method.

FIG. 10 is a view of a decorated ball made by the process of FIGS. 8 and 9.

Figure 11:
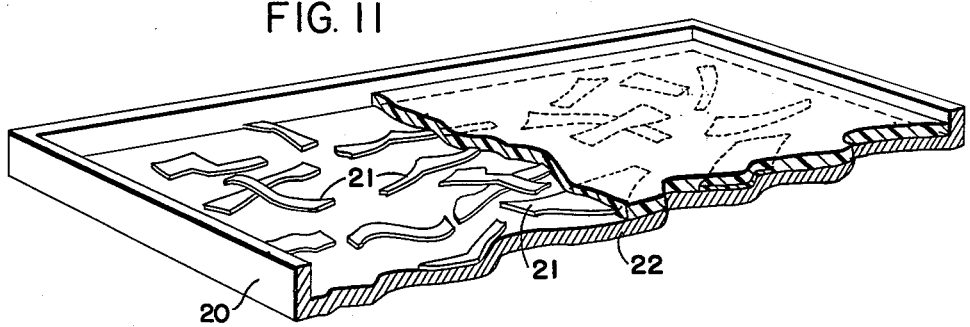
FIG. 11 is a view showing a method of carrying out the process in a stationary mold.

Referring first to the processes sought to be illustrated in FIGS. 1 to 4, inclusive, a two-part mold is shown having sections 1 and 2 and hinge connection 3. The mechanism by which this mold or any other mold used in the process is rotated simultaneously in different planes is not shown. The mold may be mounted in any suitable apparatus for this purpose and is designed to be subjected to requisite heat conditions to effect the results. The mold is cooled, usually by a water spray, after each casting operation so as to permit the mold to be opened at the end of the gelling and fusing period for removal of the finished article. Any clamping means, such as indicated at 5, is employed to hold the mold in closed position during the casting operation.

The first step in the process is to apply to the interior of the mold the design plastisols to form the decorative design. As indicated in FIG. 1 and merely as exemplary, the colored design plastisols are applied to the inner surface of both molds in any design according to the dictates of the workman. Stripes or blobs of the design plastisol are indicated at 6, and as shown by the drawing these may be of various colors and may overlap. The application of the design plastisols to the mold surfaces may be done by squirting them from guns, sprinkling, spraying or by any other means.

If accurate designs are to be reproduced, it is desirable to employ a tracing pen or similar tool which may be controlled by a pantograph or stencil.

As indicated in the foregoing portion of the specification, the design plastisol may be compounded so as to gel and fuse at the same or substantially the same temperature as the plastisol constituting the background. In such a case the mold will be preheated so that the design plastisols will set sufficiently to assure permanent form before the second charge of plastisol is admitted. In the alternative, the design plastisol may be compounded so that it fuses and at a substantially lower temperature than the background plastisol, in which case it is necessary only to bring the mold up to that temperature before applying the design plastisols. The background plastisol is then admitted and the mold brought to its gelling and fusing temperature.

By either form of the invention, the design plastisols as shown by the areas bearing the numeral 6 are fully formed or defined before the charge of the background plastisol 8 is inserted in the mold. The mold is then closed and locked, and the rotation of the mold and the heating thereof is carried on until the charge of background plastisol has been evenly and completely distributed over the interior of the mold and completely fused.

In the modification shown in FIGS. 5–7, inclusive, those portions of the completed, decorated ball which are designated as the design are first formed as sheets or foils and gelled and fused, either completely or at least to such an extent that they will not soften to the extent that they will tend to diffuse when subjected to the background plastisol and the heat required to fuse it.

In the form shown in these figures, the patterns are cut out in the form of individual pieces or sections of previously fused and set plastisols. As shown in FIG. 5, a number of disks 10 of varicolored plastisol sheetings are cut out and placed over the interior of the mold in the desired pattern so that they will adhere thereto and not be loosed during the remaining operations. If the interior surface of the mold is highly polished and the decorative pieces have a smooth polished surface, the decorative pieces will adhere to the mold during the rotational casting. The adhesion of the pieces to the surface of the mold may be improved by raising the temperature of the mold before the insertion of the background plastisol. The background plastisol 12 is now inserted in the mold and the mold rotated, and the final fusing completed. The design plastics should be so compounded as to soften slightly during the casting, gelling and fusing of the background, so as to fuse therewith without, however, losing their individual shapes.

In FIGS. 8 to 10, a still further modification of the basic method is illustrated. Here the mold is given its charge of the background plastisol 15, but in this case the plastisol is clear so that the wall will be transparent or translucent. Before the mold is closed, and before any or very little actual gelling of the plastisol 15 has occurred, pre-gelled and fused flakes, bits or chips 16 of varicolored plastisols are dropped into the liquid body. Now, as the mold rotates, the bits of colored preformed plastisols will distribute themselves over and through the wall of the articles in all sorts of attractive and unusual patterns. As the plastisol gels and then fuses the bits of pre-formed plastisol will be trapped in the wall and because the background plastisol is transparent they will show through the wall of the article as shown in FIG. 10.

Here, again, care must be exercised that the bits of colored plastisol are made from compounds of plastisols which will soften slightly during the gelling and fusing of the background plastisol so as to fuse therewith without, however, losing their individual shapes.

In FIG. 11, a stationary mold is shown at 20, and over the inner surface of the mold are applied the patches of varicolored plastisols to form the design as shown at 21. These may be made by squirting the plastisols from guns or by sprinkling or spreading the same over the mold. The colored designs may also be cut from pre-formed sheets as in the process of FIGS. 5 to 7 and applied to the mold. The background plastisol 22 is then poured or spread over the mold surface and the mold is transferred to an oven where the gelling and fusing takes place. In this example of the invention, the same precautions should be observed to prevent blending or diffusion of the pattern.

Figure 12:
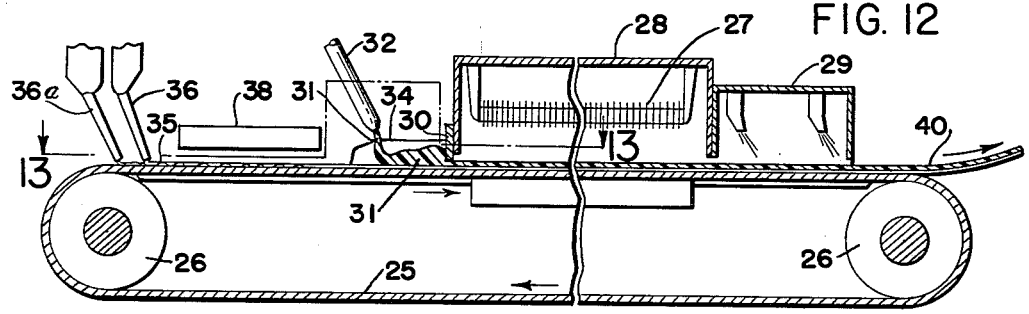
FIG. 12 is a diagrammatic view of means for carrying out the process in a continuous method.
Figure 13:
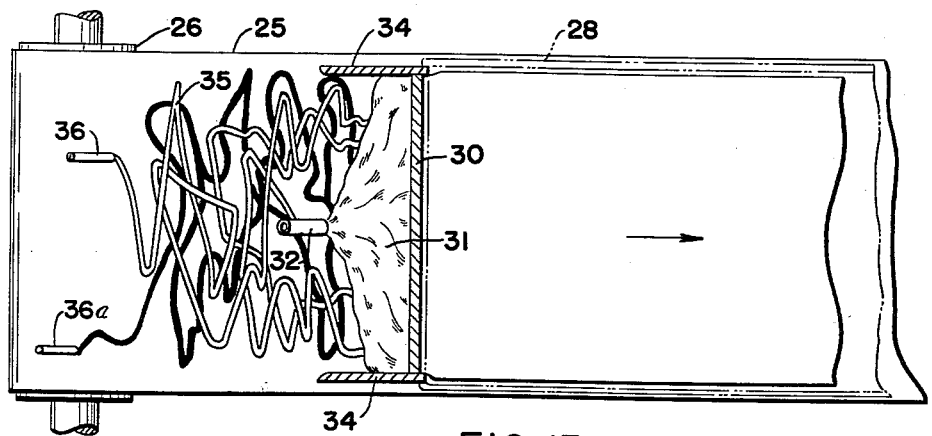
FIG. 13 is a plan of the parts shown in FIG. 12.

In the form of the invention shown in FIGS. 12 and 13, there is provided an endless belt 25, preferably of polished stainless steel, mounted on pulleys 26 and driven in the direction of the arrows. Surrounding a part of the belt is an oven 28 in which the heating means 27 is located to provide the necessary heat to gel and fuse the background plastisol. A cooling chamber 29 should also be provided adjacent the oven 28.

Just before the belt enters the oven 28 there is a doctor 30 against which is deposited a pool of the background plastisol 31 from a spout 32. This spout may be moved back and forth to distribute the background plastisol over the belt and sideboards 34 should be provided to keep the background plastisol from running off the sides of the belt.

The varicolored design plastisols are applied to the belt before it reaches the pool 31. This may be by direct application of pre-gelled bands, stripes or particles 35 of the design plastisol, as in the embodiment of the invention in FIGS. 5 and 7, or the liquid design plastisol may be deposited on the belt through a movable spout or tracing pencil indicated by the numeral 36. If two or more colors are to be employed, additional spouts or pencils 36a may be used. To secure accurate designs, the tracing pencils may be controlled by a pantograph or stencil (not shown). In such case, an auxiliary heating means 38 should be located at this position of the belt to provide the heat required to set the design portions 35 before they reach the pool 31. This can be an infra-red ray heating unit or a battery of heating units with reflectors to heat the design plastisols from above.

It will be seen that by the method diagrammatically illustrated in FIGS. 12 and 13, it is possible to make sheeting from plastisols with designs thereon as a continuous process. At the discharge point on the belt the gelled and fused sheet 40 will be stripped from the belt and stored in racks for complete cooling.

It will be appreciated that in all of the embodiments of the invention the background plastisol may be composed of plastisols of different colors so that the background itself will appear mottled or marbled, and when the term "background plastisol" is used in the specification and claims it is intended to cover a mixture of varicolored plastisols as well as a single color plastisol.

Other changes and modifications will be apparent to those skilled in the art and it is intended that such modifications as fall within the scope of the appended claims will be included herein. It is possible to combine any of the several procedures shown. Thus, either with the use of molds or a continuous belt, part of the design may be cut from pre-formed sheets and part by injecting additional colored plastisols in the molds.

While a number of representative compounds for both the design and background plastisols have been given, it is well within the knowledge of one conversant with these materials to devise many specific compounds which will operate satisfactorily. In all of the variations of the process here described, it is desirable that the design plastisol shall soften slightly while the background plastisol is being gelled so that a surface bond will be created between both plastisols and hence the design plastisol will fuse with the background plastisol without, however, losing its shape, color or identity to the background plastisol.

What is claimed is:

1. A process for the production of a hollow vinyl decorative article which comprises casting in a closed mold a layer of sharply outlined vinyl resin particles having at least one dimension smaller than the thickness of said layer surrounded by a plastisol vinyl resin which can be heat fused into a translucent mass, by introducing a measured amount of said plastisol vinyl resin into the mold, dropping into said plastisol a plurality of said vinyl resin particles, closing the mold, and rotating the mold on a plurality of axes and heating said mold to gell and fuse said plastisol into a matrix layer surrounding said particles, said particles being capable of softening during the gelling and fusing of said plastisol without losing their individual shapes.

2. A process for the production of a hollow decorative vinyl article, which comprises introducing into a mold a plurality of sharply outlined vinyl resin particles in a measured amount of plastisol vinyl resin which can be heat-fused into a translucent mass, closing the mold and rotating the mold on a plurality of axes to distribute the mixture over the surface of the mold and applying heat to gell and fuse said plastisol into a cast layer forming a matrix which holds said particles therein, said particles having at least one dimension smaller than the thickness of said layer and being capable of softening during the gelling and fusing of said plastisol without losing their individual shapes.

(References on following page)

References Cited in the file of this patent

UNITED STATES PATENTS

| | | |
|---|---|---|
| 99,479 | Robbins | Feb. 1, 1870 |
| 621,851 | Rosenberg | Mar. 28, 1899 |
| 1,610,068 | Walter | Dec. 7, 1926 |
| 1,898,515 | Albright | Feb. 21, 1933 |
| 2,193,586 | Fischett | Mar. 12, 1940 |
| 2,244,565 | Nast | June 3, 1941 |
| 2,428,977 | Mares | Oct. 14, 1947 |
| 2,473,722 | Nelson | June 21, 1949 |
| 2,486,258 | Chavannes | Oct. 25, 1949 |
| 2,588,571 | Porter | Mar. 11, 1952 |
| 2,629,134 | Molitor | Feb. 24, 1953 |
| 2,874,964 | Edwards | Feb. 24, 1959 |

FOREIGN PATENTS

| | | |
|---|---|---|
| 167,676 | Australia | Jan. 21, 1954 |

UNITED STATES PATENT OFFICE
CERTIFICATE OF CORRECTION

Patent No. 3,079,644                                      March 5, 1963

Robert P. Molitor et al.

It is hereby certified that error appears in the above numbered patent requiring correction and that the said Letters Patent should read as corrected below.

Column 4, line 59, for "is fuses and" read -- it fuses --.

Signed and sealed this 8th day of October 1963.

(SEAL)
Attest:

ERNEST W. SWIDER
Attesting Officer

EDWIN L. REYNOLDS
Acting Commissioner of Patents